United States Patent
Menchetti et al.

[11] Patent Number: 5,722,626
[45] Date of Patent: Mar. 3, 1998

[54] REUSABLE RISER

[75] Inventors: Robert J. Menchetti, Buffalo; Ronald S. Finkelstein, East Amherst; Jashbhai M. Patel, Amherst; Daniel A. Winkowski, Tonawanda, all of N.Y.

[73] Assignee: National Gypsum Company, Charlotte, N.C.

[21] Appl. No.: 567,149

[22] Filed: Dec. 4, 1995

[51] Int. Cl.$^6$ .................................................. A47G 29/00
[52] U.S. Cl. .................... 248/346.01; 108/91; 108/53.3; 52/674; 52/677; 248/346.4
[58] Field of Search .................. 248/346.01, 346.02, 248/346.4; 108/91, 93, 53.1, 53.3, 51.3; 52/537, 674, 740.8, 677

[56] References Cited

U.S. PATENT DOCUMENTS

| | | | |
|---|---|---|---|
| 422,318 | 2/1890 | Sagendorph | 52/674 |
| 429,937 | 6/1890 | Mitchell | 52/537 X |
| 857,671 | 6/1907 | Reyburn | 52/740.8 |
| 864,619 | 8/1907 | De Man | 52/740.8 |
| 882,273 | 3/1908 | Slick . | |
| 944,589 | 12/1909 | Baum, Jr. . | |
| 1,514,512 | 11/1924 | Fisher . | |
| 1,852,042 | 4/1932 | Dean | 52/740.8 X |
| 2,382,208 | 8/1945 | Corbin . | |
| 2,446,914 | 8/1948 | Fallert et al. . | |
| 2,583,443 | 1/1952 | Perry et al. | 108/51.3 |
| 2,998,132 | 8/1961 | Wilson | 206/65 |
| 3,429,544 | 2/1969 | Williams | 248/346.4 X |
| 3,446,692 | 5/1969 | Turnbull . | |
| 3,471,113 | 10/1969 | Fahey | 248/346.01 |
| 3,481,502 | 12/1969 | Slayman | 217/42 |
| 3,677,436 | 7/1972 | Danielson . | |
| 3,759,193 | 9/1973 | Branch . | |
| 4,044,083 | 8/1977 | Howe et al. . | |
| 4,065,903 | 1/1978 | Morley | 52/704 |
| 4,099,359 | 7/1978 | Sivachenko | 52/537 X |
| 4,221,292 | 9/1980 | Koebel | 206/386 |
| 4,435,463 | 3/1984 | Roellchen | 428/158 |
| 4,776,139 | 10/1988 | Lockwood | 52/537 X |
| 5,127,619 | 7/1992 | Bleim . | |
| 5,195,439 | 3/1993 | Harder | 108/51.1 |
| 5,279,082 | 1/1994 | Scholta | 52/610 |
| 5,463,965 | 11/1995 | Cordrey | 108/51.3 |

FOREIGN PATENT DOCUMENTS

| | | | |
|---|---|---|---|
| 499424 | 3/1951 | Belgium | 52/740.8 |
| 1081630 | 7/1980 | Canada . | |
| 1015551 | 10/1952 | France | 52/740.8 |
| 1121113 | 7/1956 | France . | |
| 1.300.898 | 7/1962 | France . | |
| 2 430 369 | 2/1980 | France . | |
| 16954 | 1/1904 | Sweden | 52/740.8 |
| WO 95/10013 | 4/1995 | WIPO . | |

OTHER PUBLICATIONS

European Search Report and Annex to the European Search Report on European Patent Application No. 96 30 8719, Date of Mailing of Search –Mar. 25, 1997.
Gypsum Association —4 pages —Title: SUPPORT RISERS.

*Primary Examiner*—Robert W. Gibson, Jr.
*Assistant Examiner*—Stephen S. Wentsler
*Attorney, Agent, or Firm*—Marshall, O'Toole, Gerstein, Murray & Borun

[57] ABSTRACT

This disclosure relates to a riser comprising an elongated web having one or more folds which form at least one ridge and slopes extending away from the ridge. When in use as a riser, the web is positioned on edge so that the edge surfaces of the ridges and the slopes engage the bottommost article being supported. The web preferably includes strengthening elements located at at least the ridges. A group of risers are nestable whereby they may be compactly stacked for storage and/or shipping. The edge surfaces have a surface area sufficient to avoid forming a substantial imprint in the article. The risers may be made of a recycled material, such as wood chips, plastic and gypsum, and the risers are reusable.

15 Claims, 10 Drawing Sheets

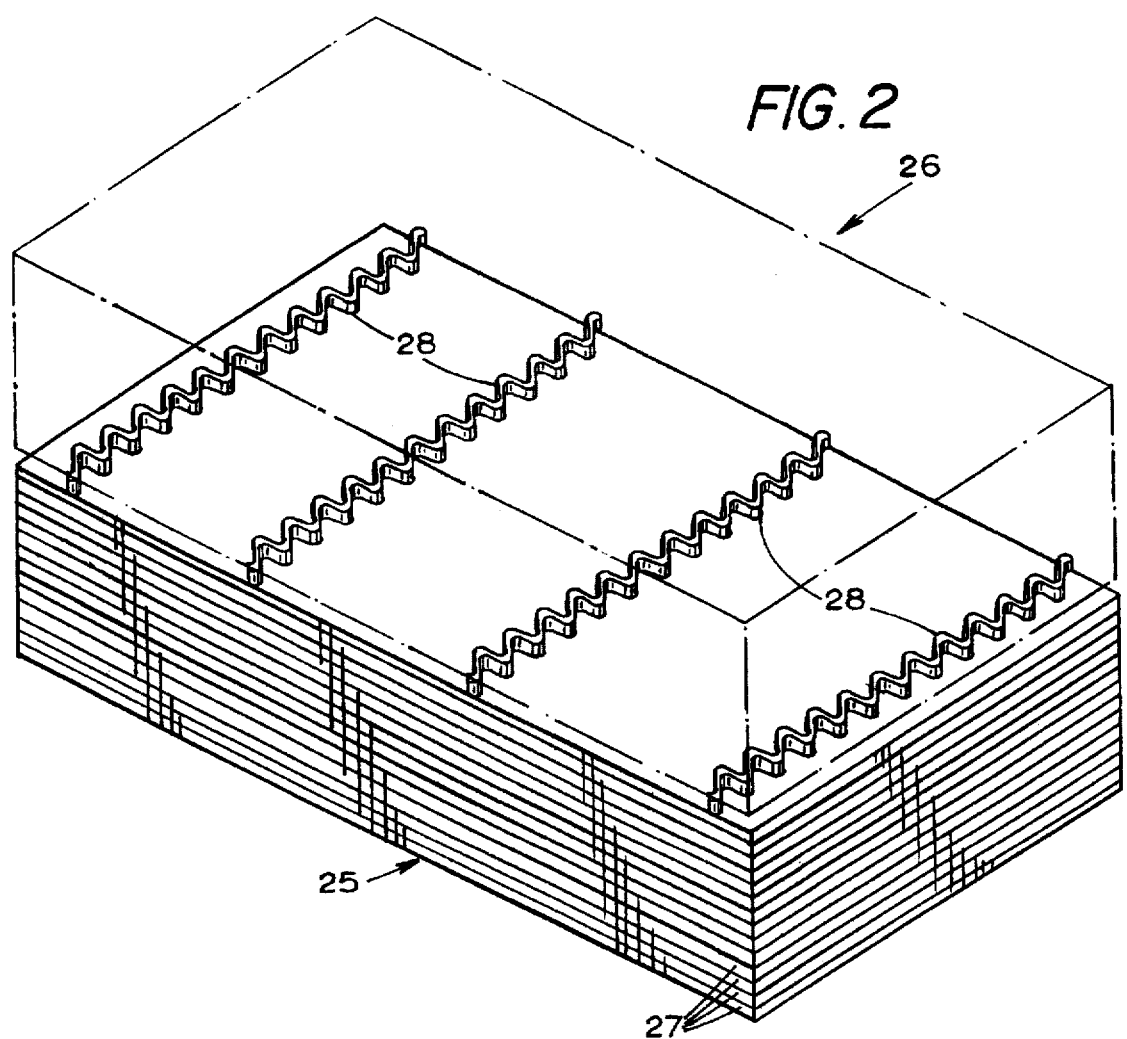
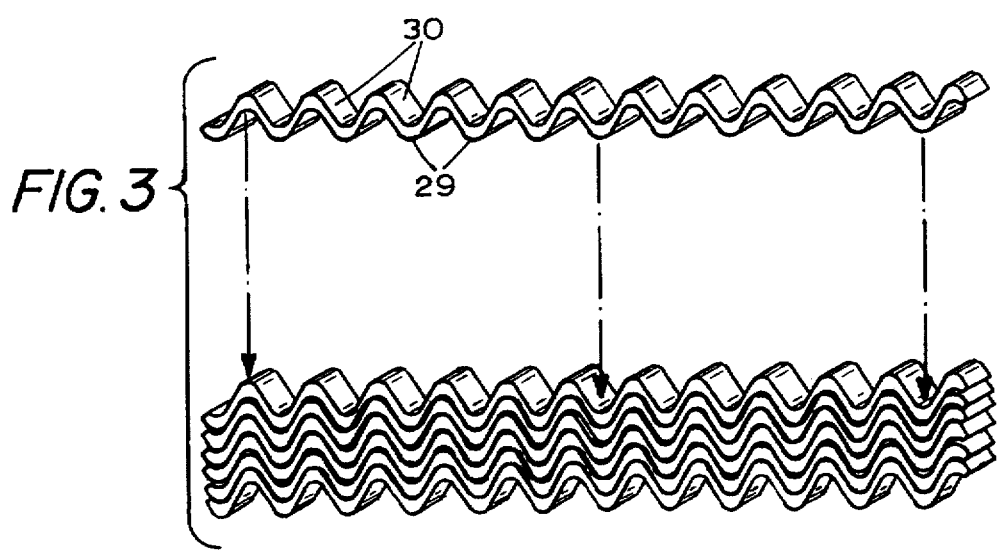

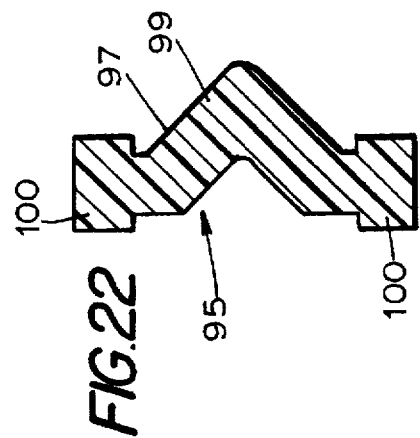
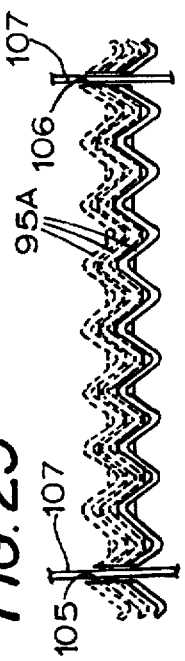
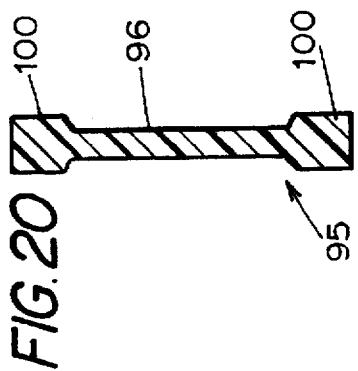
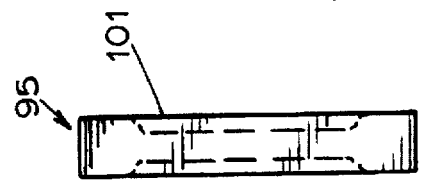
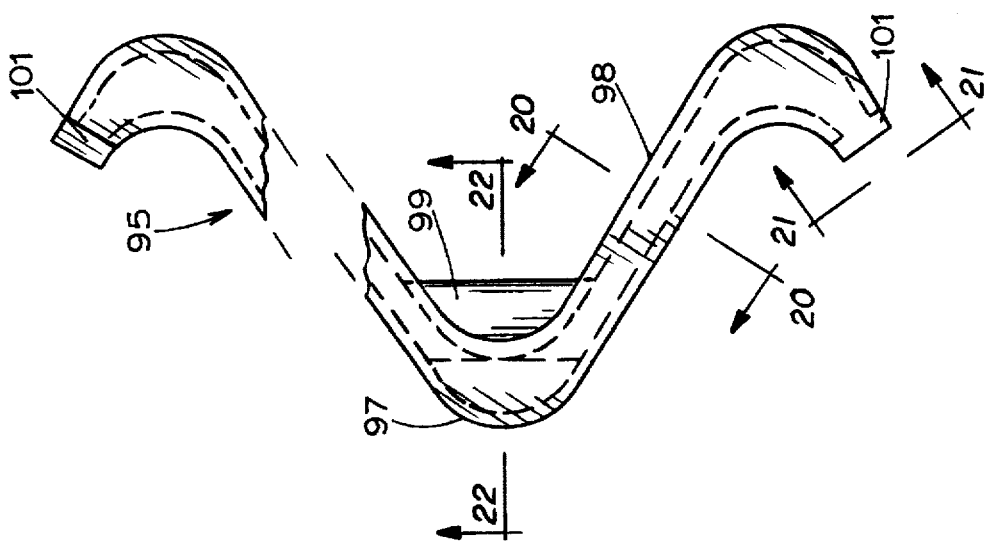

REUSABLE RISER

FIELD AND BACKGROUND OF THE INVENTION

This invention relates to risers or spacers for supporting sheet-like material, such as units of gypsum board.

During shipping and storage, it is common practice to assemble sheet-like material into units and strap the sheets together. For example, gypsum board is normally strapped in units containing about thirty to fifty sheets. Two sheets of gypsum board are fastened together by tape to form a bundle, and a number of bundles form a unit. It is customary to place each unit on a plurality of risers (also known as spacers), the purpose being to provide open spaces under the unit, into which the fork of a lift truck may be inserted. The risers also hold a unit off of a damp floor or other support surface.

FIG. 1 illustrates such an arrangement. In this example, three units 20A, 20B and 20C are stacked and supported on a floor 21. Three sets of risers 22A, 22B and 22C are positioned under the units 20A, 20B and 22C respectively, and form open spaces below the units and between adjacent risers. In a warehouse, up to about ten units may be stacked one on another in a column. Straps are not shown in FIG. 1 but normally the sheets of each unit are secured together by straps.

At the present time, it is customary to use pieces of gypsum board for the risers. Narrow strips of waste gypsum board are cut and four or five strips are stacked to form a riser which is about four inches wide and two to three inches high. When dealing with four by eight foot sheets of gypsum board, usually four risers are used as shown in FIG. 1, each riser being four feet long. In the case of four by twelve foot sheets, six risers are often provided. The gypsum board strips are usually discarded to a landfill after a single use.

Due to considerations of expense and environmental concerns regarding landfills, permanent or reusable risers constructed of an alternative material such as wood or plastic have also been provided.

Regardless of the type of material, it is desirable to keep the thickness of the risers relatively small in order to minimize the amount of material needed and the expense. At the same time, the risers must be relatively sturdy to prevent buckling when a number of units are stacked on one another. Another consideration is that a reusable riser should be capable of being compactly stacked or nested because, to be reusable, the risers need to be readily stocked and shipped to a location where they may be put to use. Another important consideration is that the contact area between the risers and the sheet material being supported must be above at least a certain value, depending on the compressive strength of material being supported, to prevent the risers from forming a substantial imprint in the adjacent sheet.

It is therefore a general object of the present invention to provide an improved riser design for sheet material, which makes efficient use of material, has good compressive strength, requires relatively little space for storage and shipping, and has dimensions which substantially avoid an imprint in the adjacent sheet.

SUMMARY OF THE INVENTION

A riser constructed in accordance with this invention comprises an elongated web having one or more folds which form at least one ridge and slopes extending away from the ridge. In use as a riser, the web is positioned on edge so that the edge surfaces of the ridges and the slopes engage the bottommost article being supported. The web preferably includes strengthening means located at at least the ridges. A group of risers are nestable whereby they may be compactly stacked for storage and/or shipping. The edge surfaces have a surface area sufficient to avoid forming a substantial imprint in the article.

BRIEF DESCRIPTION OF THE DRAWINGS

The invention will be better understood from the following detailed description taken in conjunction with the accompanying figures of the drawings, wherein:

FIG. 2 is a perspective view of two units of boards separated by risers constructed in accordance with the present invention;

FIG. 3 illustrates a plurality of nested risers in a stack;

FIG. 19 is a plan view of still another alternative form of the riser;

FIG. 20 is a sectional view taken on the line 20—20 of FIG. 19 ;

FIG. 21 is a sectional view taken on the line 21—21 of FIG. 19;

FIG. 22 is a sectional view taken on the line 22—22 of FIG. 19;

FIG. 23 shows a plurality of nested risers constructed as shown in FIG. 19;

DETAILED DESCRIPTION OF THE INVENTION

As used herein, the term riser (or spacer) is distinguished from pallet which includes a relatively broad upper platform or support member. The platform or support member is able to carry a plurality of separate articles such as pans or boxes. On the other hand, a plurality of separate risers are placed under a relatively large article such as a sheet material.

Figure 1:
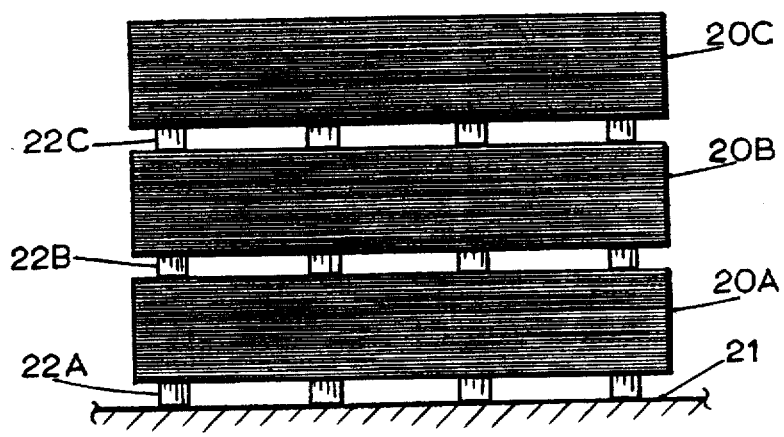
FIG. 1 illustrates a prior art assembly of units of boards separated by risers.

As discussed previously, FIG. 1 illustrates a plurality of units 20A, 20B, and 20C of boards which are separated by and stacked upon sets of risers 22A, 22B, and 22C. In a typical arrangement of this nature in the prior art, each riser is an elongated strip approximately 2½ inches high and between 3½ and 4 inches wide. Normally, the risers are vertically aligned so that the weight is applied in a vertical direction directly through the risers. The surface area at the upper and lower sides of each riser should be sufficiently large to minimize the imprint made on the boards of the units, due to the weight of the units. For example, risers having a width of four inches will have surface areas of 48 square inches per foot on its top and bottom sides. In the typical instance where the risers are made of pieces of gypsum board, a riser may consist of four strips of ⅝ inch thick gypsum board or five strips of ½ inch thick gypsum board, producing in each instance a riser that is 2½ inches high. In the example illustrated in FIG. 1, each unit is 4' by 8' and four risers, each having a length of about four feet, are positioned under each unit.

FIGS. 2 to 6 illustrate risers constructed in accordance with this invention. With reference to FIG. 2, two units 25 and 26 of boards 27 are stacked one atop the other. The two units 25 and 26 are separated by, in the present specific example, four identical risers 28. The four risers 28 extend across the width of the boards 27 and are spaced apart substantially equal distances.

Figure 4:
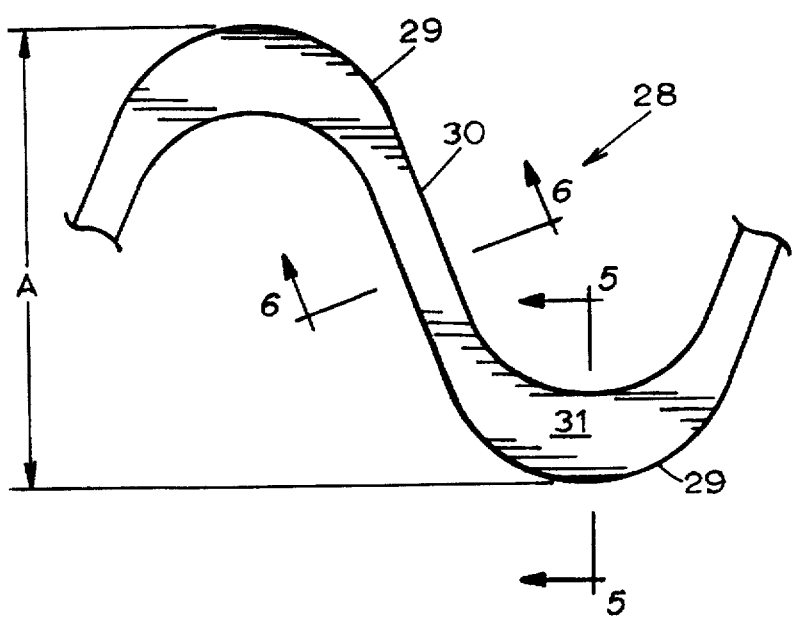
FIG. 4 is an enlarged fragmentary view of the riser shown in FIGS. 2 and 3.
Figure 5:
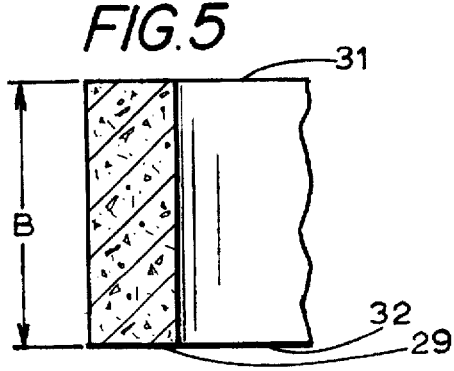
FIG. 5 is a sectional view taken on the line 5—5 of FIG. 4.
Figure 6:
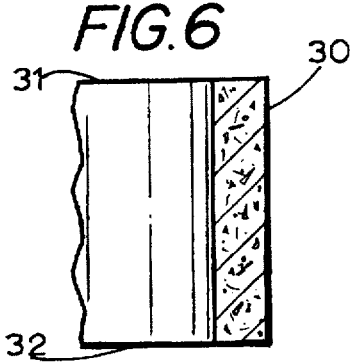
FIG. 6 as a sectional view taken on the line 6—6 of FIG. 4.

With reference to FIGS. 4, 5 and 6, each of the risers 28 is formed by a web which is folded to form a series of alternating ridges and sloped portions (referred to herein as slopes) which extend from and connect the ridges. With reference to FIG. 4, the reference numeral 29 indicates the ridges and the reference numeral 30 indicates the slopes which connect the ridges 29. The risers 28 are positioned, when in use, on edge so that when viewed from above, the ridges 29 and slopes 28 form a generally corrugated or sinusoidal configuration, as shown in FIGS. 2 and 4. The risers 28 further comprise means for strengthening the web to add compressive strength and prevent the web from buckling under the weight of the units of boards. In the embodiment of the invention illustrated in FIGS. 2–6, the thickening means comprises an increased thickness at each of the ridges 29. FIG. 6 illustrates the thickness of a slope 30 and FIG. 5 illustrates the relative thickness of the ridges 29 and it will be noted that, in this example, the ridges 29 have between approximately 1.5 to 2 times the thickness as the slopes 30. Despite the changes in the thickness, the risers are nestable as illustrated in FIG. 3 so that a large group of risers may be nested together and stacked up for convenient storage or shipment when not in use.

A variety of materials may be used in the manufacture of the risers 28, such as pressed, recycled wood chips, various plastics, molded gypsum, pressed cardboard, pressed paper, metal, etc.

As illustrated in FIG. 2, the unit 26 is supported on four risers 28 and the unit 25 is supported by another four risers (not shown in FIG. 2) which are positioned directly below the risers 28. While all of the risers will normally be substantially identical, they may be mixed and selected from any available shapes constructed in accordance with this invention.

As previously mentioned, the risers 28 are positioned on edge such that the plane of the web is substantially vertical and the upper and lower edge surfaces 31 and 32 engage the bottom surface of the lowest board in the upper unit 26 and the top surface of the uppermost board in the lower unit 25. The cumulative or aggregate surface areas of the edge surfaces 31 of the set of risers 28 is sufficient to avoid a substantial imprint on the lowest board of the upper unit 26; similarly, the aggregate surface areas of the edge surfaces 32 is sufficient to avoid a substantial imprint on the highest board of the lower unit 25. It will be apparent that the required width of the web at the edge surface 31, for example, depends on the compressive strength of the boards 27, the weight of each unit, the number of units in a stack, and the number of risers positioned between two units.

As a specific example, assume that the boards 27 are 4' by 12' by ½" high density gypsum board, that there are 34 boards in a unit, and that ten is the number of units in a stack. The foregoing is often encountered when storing gypsum board. Normally, a set of six risers are provided under 4' by 12' boards, each riser having a length of substantially four feet.

High density gypsum board has, typically, a compressive strength of about 375 psi. The total weight of ten units of high density gypsum board is about 32,640 pounds, and this is the weight supported by the lowermost set of risers. The weights supported by risers which are higher in the stack are, of course, less. Since there are six risers in the set, and since the four risers toward the center support a greater proportion of the load than the two endmost risers, the maximum weight on a riser is about 6,528 pounds. In these circumstances, the minimum surface area of each edge of each riser is about 17.5 square inches. However, it is preferred that a safety factor of at least two should be present; further, accommodation should be made for the fact that the board surfaces are not always flat, and that parts of a riser may support a greater weight than other parts. To provide an adequate safety factor in this example and in other circumstances as discussed below, a preferred minimum edge surface area on each edge of a riser is 60 square inches.

As another example, low density gypsum board has a typical compressive strength of 200 psi; the weight of ten units (34 sheets of 4' by 12' by ½" boards in each unit) is about 28,560 pounds; and six risers are provided, each riser having a length of four feet. A preferred minimum edge surface area of each edge of a riser in these circumstances of 60 square inches results in a compression of about 95 psi which again provides a safety factor of slightly over two.

Other materials may have a higher compressive strength, and consequently the risers may be thinner. Cementitious/gypsum board, for example, has a strength of about 3,500 psi, and therefore the edge surface area of each riser may be nearly one-tenth that of the riser for gypsum board (assuming the same number of risers).

In all of the embodiments described herein, the risers are designed for use with gypsum board and have the preferred minimum edge surface area. For smaller size boards, fewer risers may be used and still meet the preferred minimum surface area. Four risers in a set may be used with 4' by 8'×½" gypsum boards, and five risers in a set may be used with 4'×10'×½" gypsum board.

Further, since the risers are positioned on edge, the distance in the horizontal direction between the peaks of adjacent ridges of a riser should be at least a minimum value to avoid the chance that a riser will tip over. It is preferred that the distance in the horizontal direction between peaks be at least 40% of the vertical height of the riser. In other words, with reference to FIGS. 4 and 5, it is preferred that dimension A be at least 40% of dimension B (dimension A is greatly exaggerated in FIG. 4 to better illustrate the shape of this embodiment).

Figure 7:
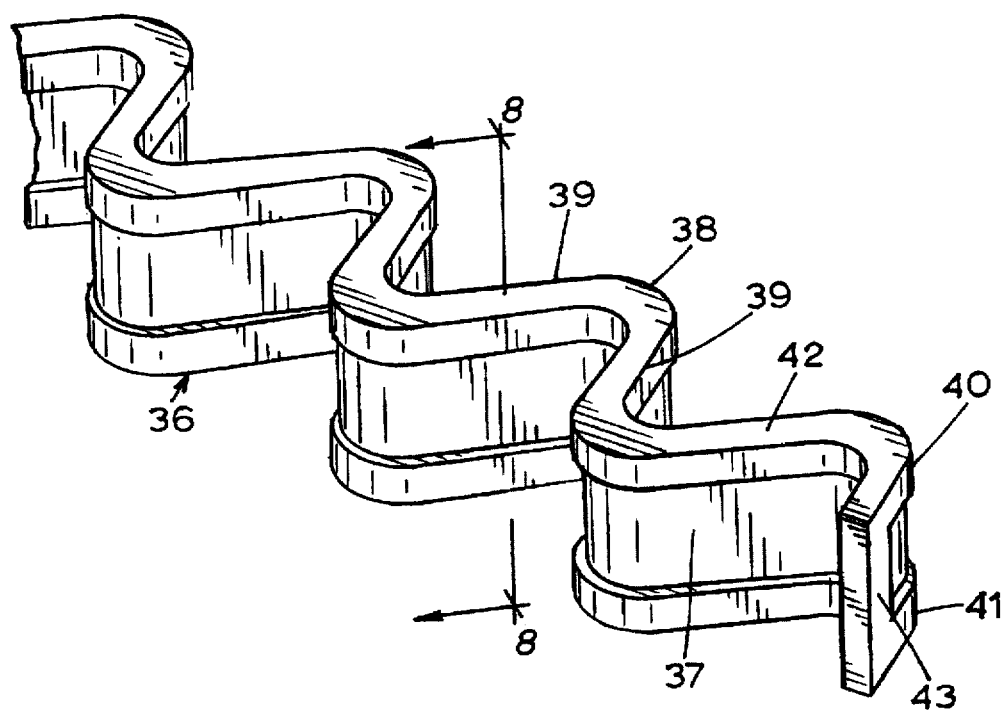
FIG. 7 is a perspective view illustrating an alternative form of the riser.
Figure 8:
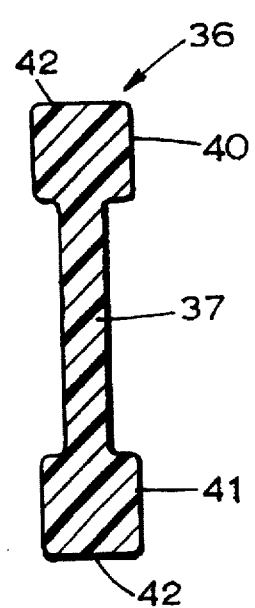
FIG. 8 is a sectional view taken on the line 8—8 of FIG. 7.

FIGS. 7 and 8 illustrate an alternative embodiment of the invention wherein a riser 36 is formed by a web 37 which includes a series of ridges 38 and slopes 39. As illustrated in FIG. 8 in particular, the web 37 is thickened at its edge portions 40 and 41, and these edge portions both form the strengthening means which prevent the web from buckling and they increase the areas of the edge surface 42, which contact the board or sheet-like articles supported by the risers. In the constructions shown in FIGS. 7 and 8, the strengthening means extends both through the ridges 38 and through the slopes 39, whereby the web has a substantially constant cross section from one end to the other. Further, at each end of the riser 36, a thickened end portion 43 of the web extends vertically between the thickened portions 40 and 41.

Figure 9:
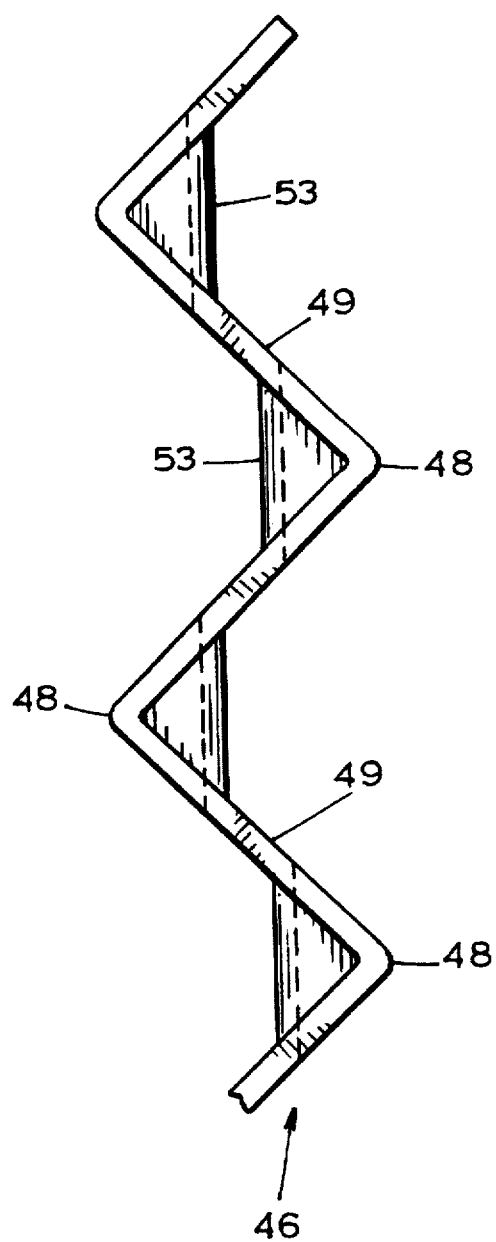
FIG. 9 is a plan view of another alternative form of the riser.
Figure 10:
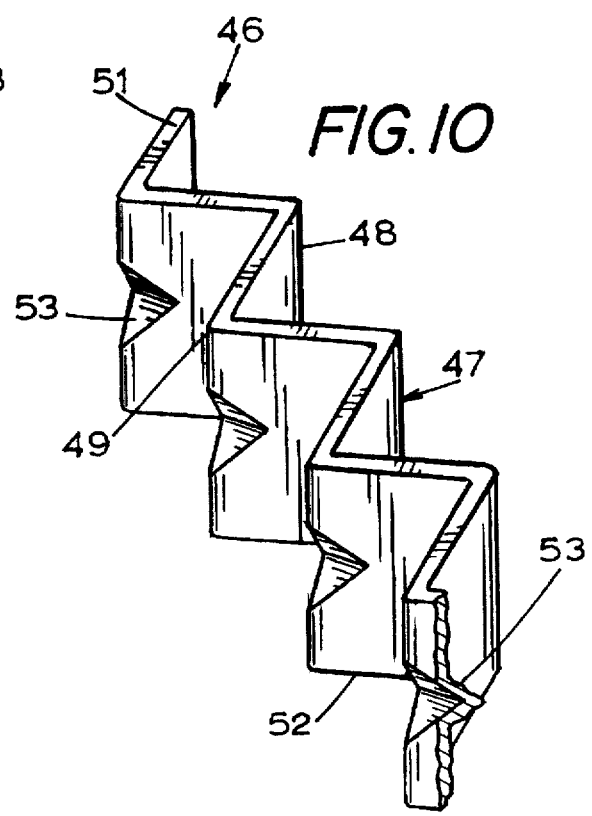
FIG. 10 is a perspective view of the riser shown in FIG. 9.

FIGS. 9 and 10 illustrate a riser 46 which again is formed by a web 47 having alternating ridges 48 and slopes 49. As shown in FIG. 10, the web 47 has a substantially constant thickness between its upper and lower edge surfaces 51 and 52. Strengthening means is provided at each of the peaks of 48 in the form of a gusset 53 which is formed substantially midway between the two edge surfaces 51 and 52 and is formed on the internal sides of the peaks 48. As best illustrated in FIG. 9, the gussets 53 connect the peaks 48 with the sides of the slopes 49, and they add strength to the web to prevent buckling. Nevertheless, the riser 46 is nestable because the gussets fit one within the other when the risers are nested. It will also be noted that the peaks 48 are relatively sharp or pointed and that the slopes 49 are relatively straight, as compared with the smoothly curved peaks and slopes shown in FIGS. 2 to 8.

Figure 11:
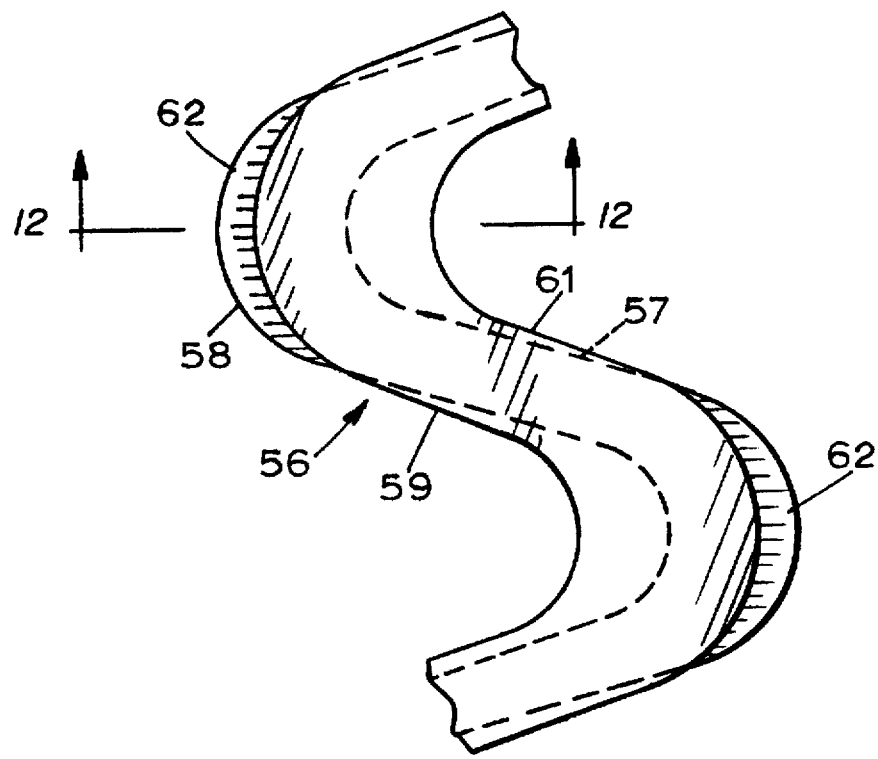
FIG. 11 is a plan view showing another alternative form of the riser.
Figure 12:
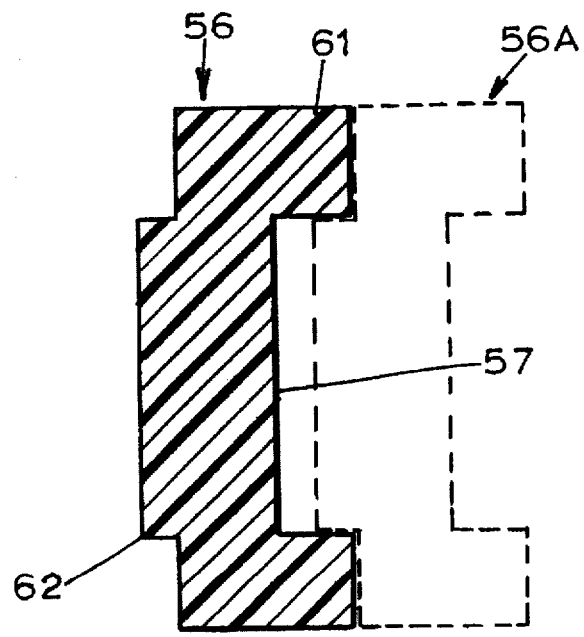
FIG. 12 is a sectional view taken on the line 12—12 of FIG. 11.

The riser 56 illustrated in FIGS. 11 and 12 is also formed by a web 57 having a corrugated or sinusoidal shape. The web 57 includes ridges 58 and slopes 59. At the slopes 59, the web 57 is widened or thickened similar to the thickened portion 38 and 39, shown in FIG. 8. The thickened width portions are indicated by the numeral 61 in FIGS. 11 and 12. At the ridges 58, the web extends outwardly from the widenings or thickenings 61 to form projections 62 at the outside radiuses. The projections 62 in combination with the widened portions 61 form strengthening means for the web, and, of course, the widened portions 61 form relatively large edge surface areas which engage the boards. FIG. 12 further illustrates the manner in which two of the risers 56 may nest when stacked. A second riser 56A is shown by the dashed lines.

Figure 13:
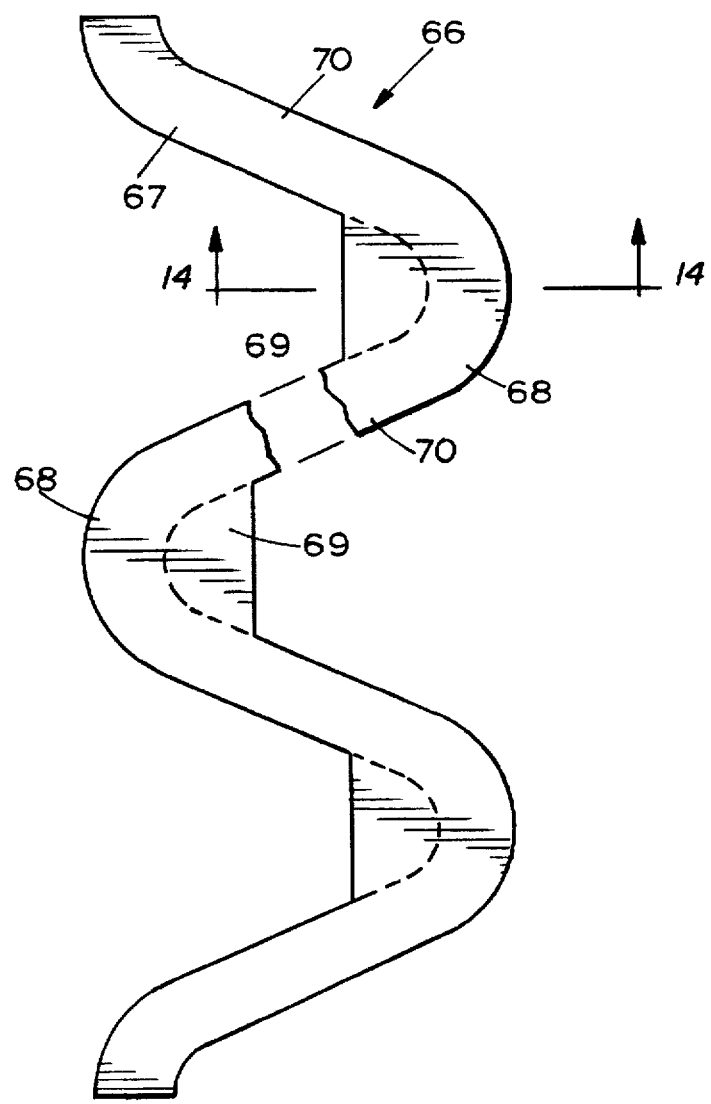
FIG. 13 is a plan view of another alternative form of the riser.
Figure 14:
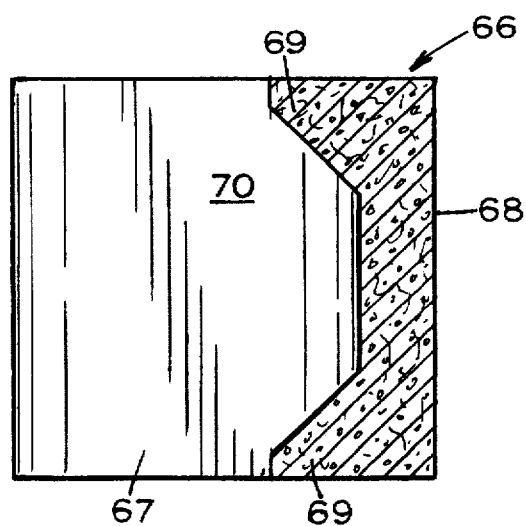
FIG. 14 is a sectional view taken on the line 14—14 of FIG. 13.

FIGS. 13 and 14 illustrate a riser 66 including a web 67 having substantially a sine wave shape. The web 67 has a substantially constant cross sectional size and shape except at the peaks 68 where projections 69 are formed at the upper and lower edges. The projections 69 extend inwardly and join each peak with the inner sides of the adjoining slopes 70. The projections 69 serve both to add strength to the web at the peaks and to increase the edge surface area.

Figure 15:
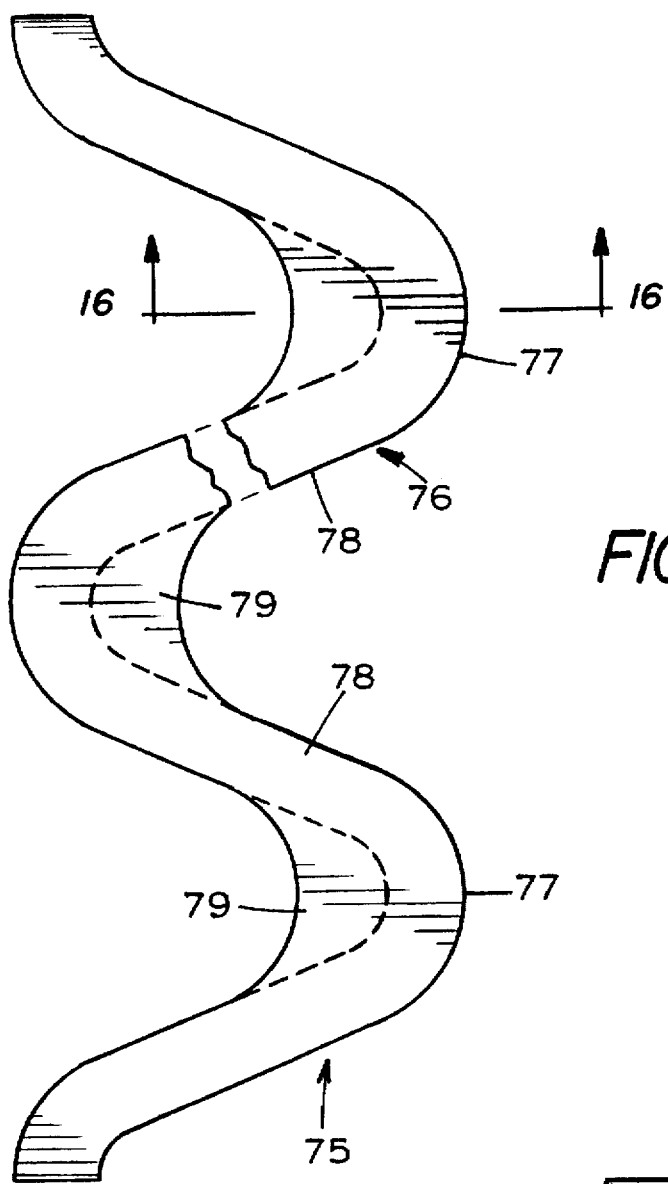
FIG. 15 is a plan view showing another alternative form of the riser.
Figure 16:
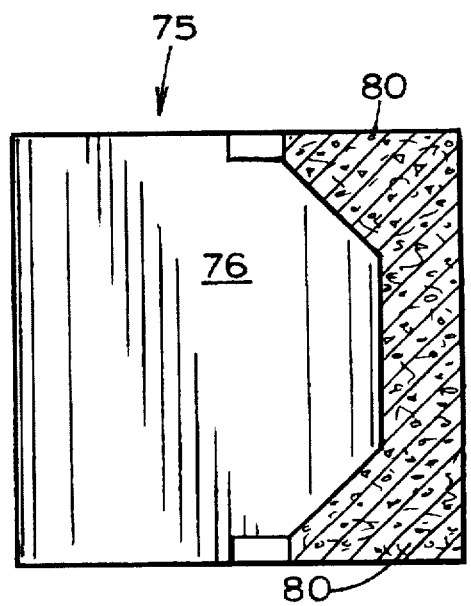
FIG. 16 is a sectional view taken on the line 16—16 of FIG. 15.

FIGS. 15 and 16 show a riser 75 which is generally similar to the riser 66 shown in FIGS. 13 and 14. The riser 75 includes a generally sinusoidal web 76 which forms ridges 77 and slopes 78. On the underside of the ridges 77 are formed projections 79 which extend inwardly from the ridges at the upper and lower edge surfaces 80. The projections 79 are curved and merge smoothly into the slopes 78.

Figure 17:
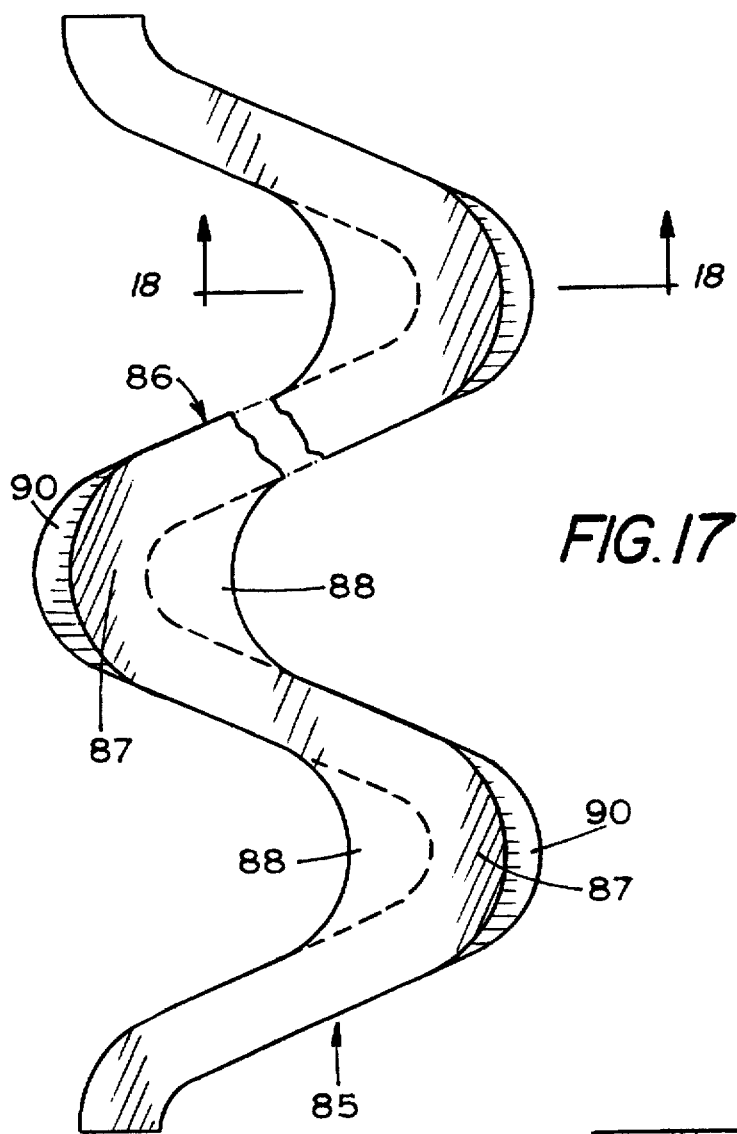
FIG. 17 is a plan view of still another alternative form of the riser.
Figure 18:
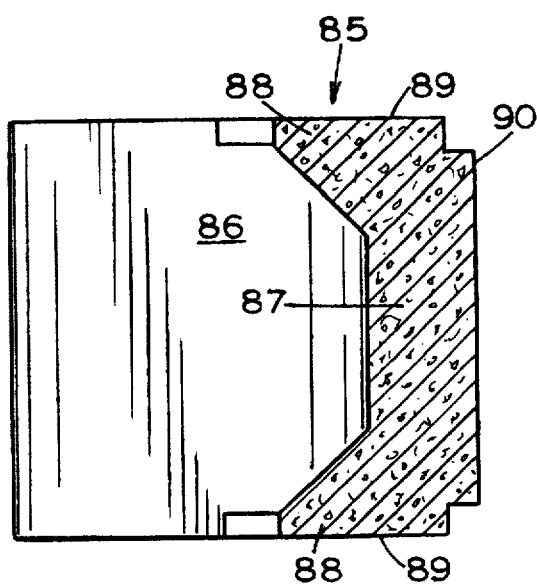
FIG. 18 is a sectional view taken on the line 18—18 of FIG. 17.

FIGS. 17 and 18 show a riser 85 formed by a web 86 again having a generally sinusoidal shape. At the ridges 87 are formed projections 88 which extend inwardly from the inner sides of the ridges at the upper and lower edge surfaces 89. In addition, a projection 90 is formed on each ridge, each projection extending outwardly from the center area of the web. As is true of the other embodiments described herein, a plurality of the risers 85 may be nested closely together for storage or shipment.

FIGS. 19 to 22 show a riser 95 formed by a web 96 having a generally sinusoidal shape. At the ridges 97, the web is thickened compared to the thickness at the slopes 98 (compare FIGS. 20 and 22). Further, gussets 99 are formed at the undersides of the ridges, at the center of the web. Still further, the edge portions 100 are widened at the upper and lower edges, as best shown in FIGS. 20 and 22. At the ends 101 (see FIGS. 19 and 21) of the riser, the entire vertical length of the web is thickened.

FIG. 23 illustrates a stack of the risers 95A, the risers 95A nesting with one another as shown and as previously described herein. The risers 95A have substantially the same configuration as the risers 95. In addition, the risers 95A have at least one hole formed through the web, the holes being aligned when the risers 95A are nested. In the example shown in FIG. 23, holes 105 are formed through the web adjacent one end of each riser 95A, and a second hole 106 is formed through the web adjacent the other end. Rods 107 are inserted through the holes 105 and 106, and the rods may be used to suspend the risers 95A from a hanger (not shown). While two holes and rods are shown, only one hole and one rod may be provided. The rods also serve to hold the risers in neatly assembled relation, and they may be used when transporting a stack of risers.

Figure 24:
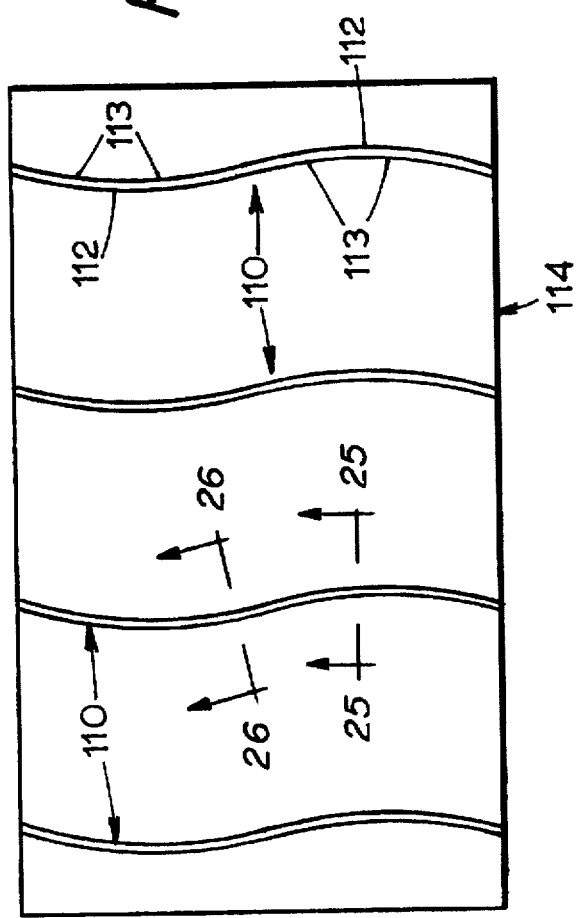
FIG. 24 shows a plurality of risers on sheet material.
Figure 26:
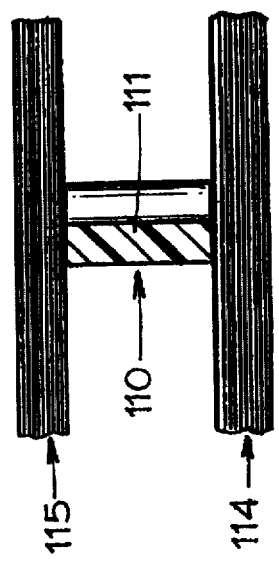
FIG. 26 is a sectional view taken on the line 26—26 of FIG. 24.
Figure 25:
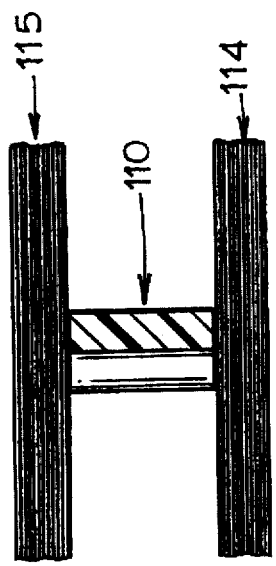
FIG. 25 is a sectional view taken on the line 25—25 of FIG. 24.

The above-described risers all include a plurality of sine waves or folds. The risers 110 shown in FIGS. 24 to 26 are a more simplified design wherein a web 111 has a substantially constant cross-sectional shape and size throughout its length. Further, the web 111 forms only two ridges 112 and two slopes 113 on each side of each ridge. While the web 111 forms a smoothly curving sine wave shape, the web could instead form relatively pointed ridges and straight slopes as illustrated in FIGS. 9 and 10. FIG. 24 shows four risers 110 on a unit 114 of 4' by 8' boards or sheets, and FIGS. 25 and 26 show the risers separating two units 114 and 115.

As mentioned previously, the risers may be made of a variety of materials, such as pressed wood chips, various plastics, and composites of various materials. Recycled waste gypsum wallboard may be processed and combined with a strengthening and/or bonding agent and molded to a shape in accordance with this invention. As examples of a composite riser, a styrofoam layer sandwiched between two strips of gypsum and glued together with a formulated recycled gypsum paste, or a polyurethane foam sandwiched between two strips of gypsum and glued as described above may be used. A polyfoam and/or a polymer may also be used.

The material used in the riser should have a compressive strength at least as high as the compressive load exerted on the riser by the material to be supported.

It will be apparent from the foregoing that an improved riser design has been provided. Risers in accordance with this invention may be made, for example, of recycled or waste material and may be reused. The risers are preferably nestable to facilitate storage and shipping. It is an important feature that a riser in accordance with this invention has one or more folds so that it may be positioned on edge and is not likely to tip over. The fold or folds form a continuous strip which does not have an end (except at the ends of the riser) which may be exposed to a high compressive force. At the ends of each riser, there may be a reduced compressive force because of a tapered reduction in thickness adjacent the edges of sheet material (as is usually true of gypsum board) or because of a designed recess adjacent the side edges of a sheet material. In other words, each portion, such as a ridge, of a riser in accordance with this invention is supported on each side by adjoining slopes, and these parts served to support each other when under a high compressive force.

What is claimed is:

1. Apparatus for supporting an article, comprising at least first and second risers, said first riser being separated from and movable with respect to said second riser, said risers being nestable in close engagement, each of said risers further comprising a web having a width, thickness and an elongated length, said length being substantially greater than said width and said thickness, and said width being greater than said thickness, said web having first and second parallel edge surfaces which are spaced apart in the direction of said width and having two sides which are spaced apart in the direction of said thickness, said web comprising a fold which forms at least one ridge and at least one slope adjoining said ridge, said fold extending laterally in the direction of said sides and said first and second edge surfaces being in spaced apart substantially flat parallel planes, whereby an article positioned against one of said edge surfaces causes a compressive force across said width and wherein said ridge forms an outer ridge surface and an inner ridge surface and first and second projections extending from said inner ridge surface, each of said first and second projections gradually decreasing in size in a direction toward said slope, said first projection being adjacent said first edge surface and said second projection being adjacent said second edge surface, said projections sized to provide for engagement between adjacent risers during nesting of the at least first and second risers.

2. Apparatus as set forth in claim 1, wherein said web has a plurality of substantially identical folds.

3. Apparatus as set forth in claim 1, wherein said fold has the shape of a sine wave and said ridge is curved.

4. Apparatus as set forth in claim 1, wherein said fold forms a relatively sharp corner at said ridge.

5. Apparatus as set forth in claim 1, wherein said web includes thick portions adjacent said edges, said thick portions being formed by increased thickness adjacent said edges.

6. Apparatus as set forth in claim 1, wherein said web includes a projection which extends from said outer ridge surface.

7. Apparatus as set forth in claim 1, further comprising a third projection extending from said ridge outer surface between said first projections, said third projection being spaced from both said first edge surface and said second edge surface, said third projection gradually decreasing in size in the direction toward said slope.

8. Apparatus as set forth in claim 1, wherein said at least first and second risers are made of a plastic.

9. Apparatus as set forth in claim 1, wherein said at least first and second risers are made of pressed wood particles.

10. Apparatus as set forth in claim 1, wherein said at least first and second risers are made of a molded composite of gypsum and a plastic.

11. Apparatus as set forth in claim 1, wherein said at least first and second risers are made of a composite of gypsum and a strengthening binder.

12. Apparatus as set forth in claim 1, wherein said at least first and second risers are made of molded gypsum.

13. Apparatus as set forth in claim 1, wherein said at least first and second risers are made of metal.

14. Apparatus as set forth in claim 1, wherein said at least first and second risers each have a compressive strength at least as high as the compressive force exerted on said riser by the articles.

15. Apparatus as set forth in claim 1, wherein said edges have a surface area sufficient to avoid a substantial imprint in the article.

* * * * *